United States Patent [19]

Pearson

[11] 4,249,411
[45] Feb. 10, 1981

[54] ZERO-G MASSMETER

[75] Inventor: Jerome Pearson, Dayton, Ohio

[73] Assignee: The United States of America as represented by the Secretary of the Air Force, Washington, D.C.

[21] Appl. No.: 43,983

[22] Filed: May 31, 1979

[51] Int. Cl.³ .............................................. G01N 9/00
[52] U.S. Cl. .......................................... 73/12; 73/167
[58] Field of Search .................... 73/167, 12; 244/158, 244/1 R

[56] References Cited

U.S. PATENT DOCUMENTS

| 2,993,372 | 7/1961 | Bleakney et al. | 73/167 |
| 3,379,974 | 4/1968 | Dryden | 73/167 |
| 3,605,482 | 9/1971 | Humes | 73/12 |
| 4,131,012 | 12/1978 | Courtiol | 73/167 |

Primary Examiner—Donald O. Woodiel
Attorney, Agent, or Firm—Donald J. Singer; Richard J. Killoren

[57] ABSTRACT

An apparatus for determining the mass of an unknown object in a zero gravity environment having an impact plate connected at one end of a spring with the other end connected to an object of known mass, such as a space vehicle. A movement of the impact plate acts to close a switch which is again opened at the end of the impact time. With the spring constant k and the known mass m the mass M of the unknown object can be determined from the duration of impact t by using the expression $$M = \frac{kt^2}{\pi^2 - \frac{kt^2}{m}}.$$

5 Claims, 4 Drawing Figures

ZERO-G MASSMETER

RIGHTS OF THE GOVERNMENT

The invention described herein may be manufactured and used by or for the Government of the United States for all governmental purposes without the payment of any royalty.

BACKGROUND OF THE INVENTION

This invention relates to an apparatus for determining the mass of an object in a zero gravity environment. In zero gravity environments, such as in space, the mass or weight of an object cannot be measured with a conventional scales. The U.S. Pat. No. to Dryden, 3,379,974, discloses a system for determining momentum and velocity of particles in space. Other systems are known for providing information regarding particles in zero gravity environments which require the use of a powered shaker.

BRIEF SUMMARY OF THE INVENTION

According to this invention the mass of an object is determined by measuring the duration of impact of the mass and spring supported on a known mass. An impact plate is coupled to the spring system. An electrical contact is positioned adjacent the spring system and is closed at the moment of impact and opened when the spring system returns to its original position before impact. The duration of impact, the supporting mass and the spring constant are then used to determine the unknown mass.

IN THE DRAWINGS

DETAILED DESCRIPTION OF THE INVENTION

Figure 1:
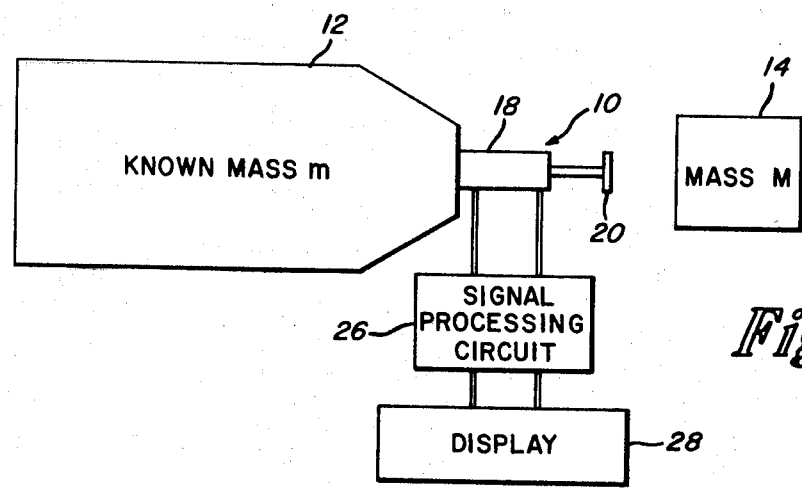
FIG. 1 is a schematic diagram of an apparatus for determining the mass of an object according to the invention.
Figure 2:
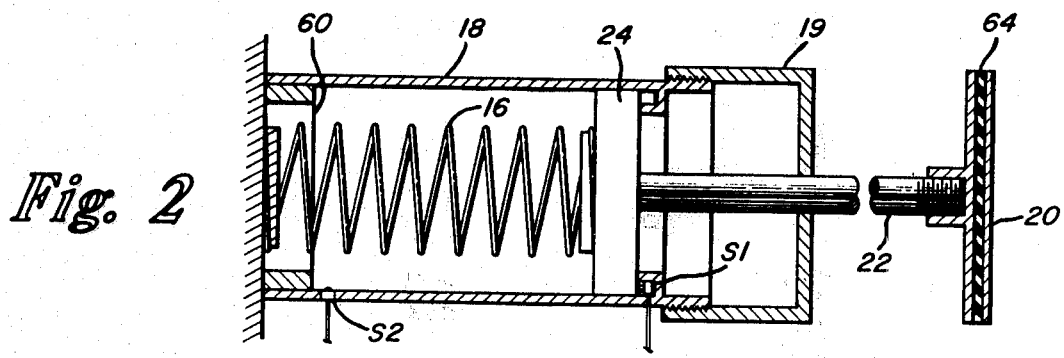
FIG. 2 is a partially schematic diagram showing the spring system for the device of FIG. 1.

Reference is now made to FIG. 1 of the drawing which shows an apparatus 10 including an object 12 of known mass m for measuring the mass M of an object 14 of unknown mass. A spring 16 is supported on the object 12 and is positioned within a guide cylinder 18, as shown in FIG. 2. An impact plate 20 is secured to piston 24 through shaft 22. The piston 24 engages the opposite end of spring 16 from object 12. A first switch S1, connected in processing circuit 26, opens when piston 24 starts to move toward object 12 and closes when piston returns to the starting position. The elapsed t between the opening and closing of switch S1 is equal to one half of the period T of a system having two blocks of mass $m_1$ and $m_2$ connected together by a spring of constant k where the natural frequency is given by the expression:

$$\omega = \frac{k(m_1 + m_2)}{m_1 m_2} \text{ radian/sec} \quad (1)$$

as given on page 63 of "Schaum's Outline of Theory and Problems of Mechanical Vibrations", by William W. Seto. Converting to cps and time:

$$\omega = 2\pi f = \frac{2\pi}{T} = \frac{k(m_1 + m_2)}{m_1 + m_2} \quad (2)$$

substituting the elapsed time 2t for T:

$$\frac{\pi}{t} = \frac{k(m_1 + m_2)}{m_1 + m_2} \quad (3)$$

squaring:

$$\frac{\pi^2}{t^2} = \frac{k(m_1 + m_2)}{m_1 m_2} \quad (4)$$

letting $m_1 = m$, the known mass, and $m_2 = M$, the unknown mass, and solving for M:

$$M = \frac{kt^2}{\pi^2 - \frac{k}{m} t^2} \quad (5)$$

Figure 3:
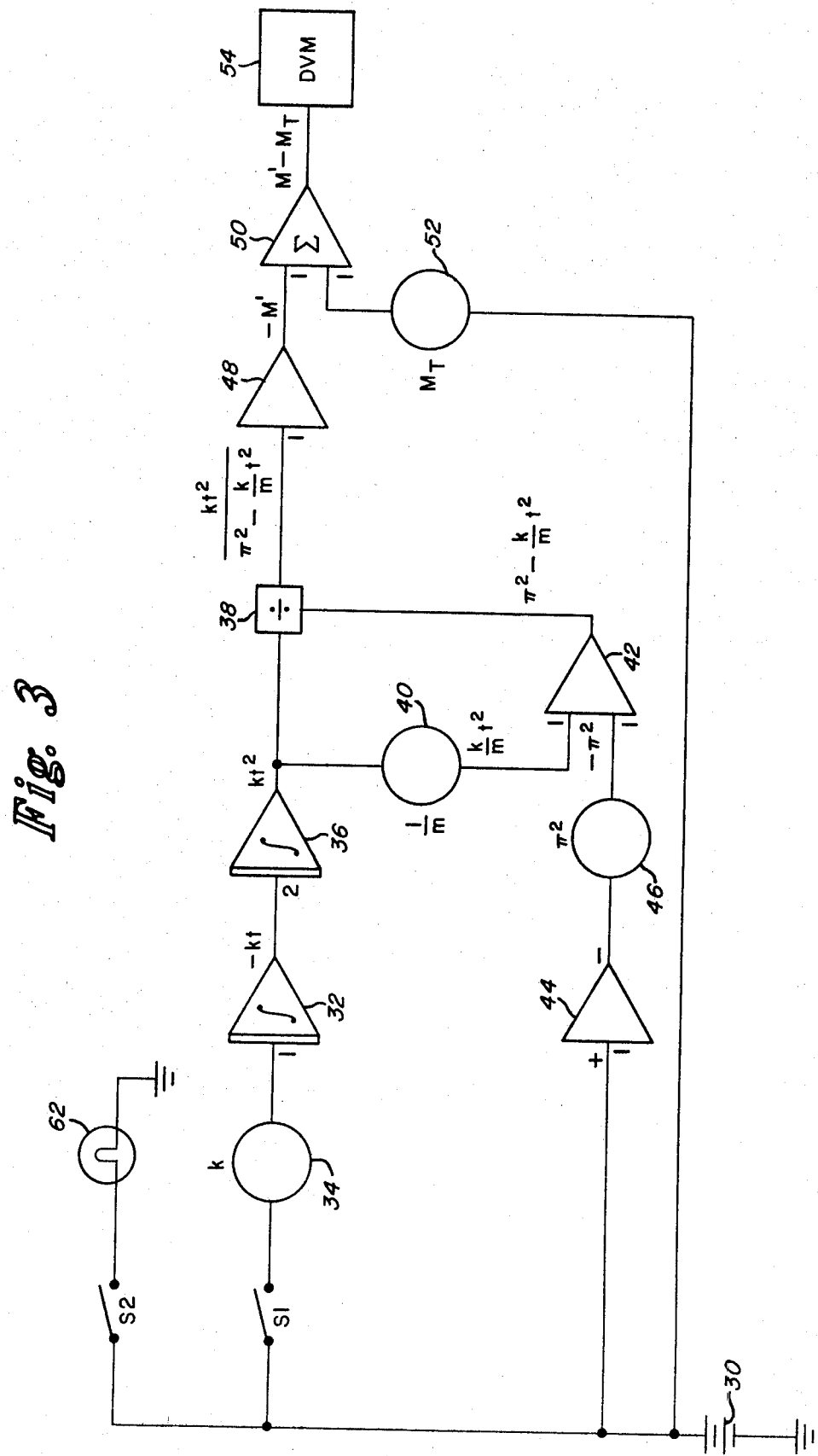
FIG. 3 is a schematic diagram showing one signal processing and display system for use with the device of FIG. 1.

Thus, with the spring constant k, the mass m and the impact time t known, the mass M of the unknown object can be determined, as shown in FIG. 3.

Upon closing switch S1 the positive voltage from supply 30 is supplied to integrating circuit 32 through a scaling potentiometer 34 which enters the spring constant k. The output of the first integrating circuit is supplied to a second integrating circuit 36, with a gain of 2, to provide an output proportional to $kt^2$.

The output of the second integrating circuit is supplied to a divide circuit 38 and to a scaling potentiometer 40 which enters $$\frac{1}{m}$$

so that the output of the scaling potentiometer 40 is proportional to $$\frac{k}{m} t^2.$$

The output of scaling potentiometer 40 is supplied to one input of summing circuit 42.

The output of an inverter 44 is supplied to a scaling potentiometer 46 which enters $\pi^2$ with the output proportional to $-\pi^2$ being supplied to the second input of summing circuit 42. The inputs $-\pi^2$ and $$\frac{k}{m} t^2$$

after summing and inversion in the summing circuit 42 provides an output proportional to $$\pi^2 - \frac{k}{m} t^2.$$

which is supplied to a second input of divide circuit 38. The output of the divide circuit 38 is proportional to $$\frac{kt^2}{\pi^2 - \frac{k}{m}t^2}.$$

From expression (5) above and with the apparatus shown:

$$\frac{kt^2}{\pi^2 - \frac{k}{m}t^2} = M' \quad (6)$$

where M' is equal to the unknown mass M plus a tare mass $M_T$. The tare mass $M_T$ is equal to the mass of the impact plate 20, the mass of shaft 22 and the mass of piston 24 plus the mass of the spring effective in M'. From paragraph 11, page 9 of "Schaum's Outline of Theory and Problems of Mechanical Vibration" this is equal to ⅓ the mass of the spring.

To provide a signal proportional to M equal to $M'-M_T$, the output of divide circuit 38 is supplied to an inverter 48 which provides an output proportional to $-M'$. The output of the inverter is supplied to one input of summing circuit 50. The scaling potentiometer 52 provides an input proportional to $M_T$ to the second input of summing circuit 50. After summing and inversion in the summing circuit an output $M=M'-M_T$ is provided. Various devices could be used for displaying this information in display device 28; for example, the device could be a digital voltmeter 54 connected to the output of the summing circuit 50.

A stop 60 may be provided to limit the travel of piston 24. Also an overload switch S2 may be provided to indicate that either the mass or velocity of the unknown object is too great for the system to provide an accurate indication. Although the period of the spring-mass system is independent of velocity, an excessive relative velocity can overload the system. The switch S2 may be used to operate an overload light 62 or otherwise indicate an overload condition. For large masses very low relative velocities should be used. A shock absorbing material 64, such as high loss rubber, may be provided in the impact plate 20 to absorb the initial impact shock.

The guide cylinder closure member 19 on the guide cylinder 18 may be removed for replacement of the spring with different spring constants to increase the useful range of the device. With a different spring used the new spring constant would be entered in potentiometer 34.

In the operation of the device the known mass 12, such as a space craft, is made to approach the unknown object with a low relative velocity. Upon impact the spring 16 is compressed and switch S1 is closed. After a time t equal to ½ the period T of the two mass and spring systems, the switch S1 is again opened. An indication of the mass of the unknown object is provided on the digital voltmeter 54, as described above.

Figure 4:
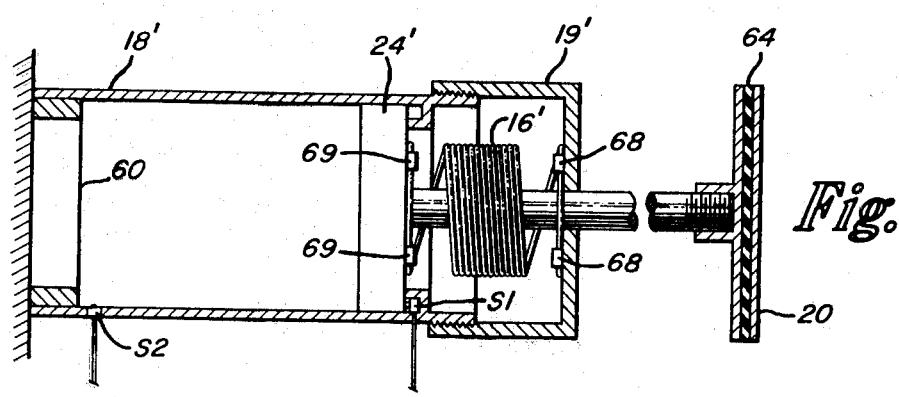
FIG. 4 is a partially schematic diagram of another embodiment of a spring system for use with the device of FIG. 1.

While a compression spring is shown in the device thus far described, a tension spring could be used as shown in FIG. 4.

In this device the spring 16' is secured to piston 24' and cap 19' by clamps, shown schematically at 68 and 69. Switch S1 is closed as piston 24' starts to move at impact as in the device of FIG. 1. The device otherwise operates in the same manner as the device described with respect to FIGS. 1-3.

The system can also be used to determine the mass of unknown objects within the spacecraft or under other zero gravity conditions. Where the mass m is very large, compared to the unknown mass M and with smaller springs used to measure the unknown mass, the term $$-\frac{k}{m}t^2$$

will be relatively very small compared to the other terms and will have no appreciable affect on the final measurement. Thus, the expression $$M = \frac{kt^2}{\pi^2}$$

can be used for determining the mass of the unknown object. This expression can also be determined from the expression for the period $$T = \frac{2\pi}{\sqrt{k/m}},$$

for a simple spring mass system, given at the top of page 6 of "Schaum's Outline of Theory and Problems of Mechanical Vibrations".

There is thus provided a system for determining the mass of an object in a zero gravity environment.

I claim:

1. An apparatus for determining the mass of an object in a zero gravity environment, comprising: an object of known mass; a spring system constrained at one end by said object of known mass; an impact plate attached to the other end of said spring system; means for limiting the direction of motion of said impact plate to a direction along the axis of the spring system; means, positioned adjacent to said spring system for producing a signal t proportional to the duration of impact of said object of unknown mass with said impact plate; means, responsive to said signal for providing an output signal proportional to $$\frac{kt^2}{\pi^2 - \frac{k}{m}t^2},$$

where k is the spring constant and m is the mass of the object of known mass.

2. The device as recited in claim 1 wherein said means for limiting the direction of motion of said impact plate to a direction along the axis of the spring system includes a guide cylinder connected to said object of known mass; a piston within said guide cylinder and means for connecting said impact plate to said piston.

3. The device as recited in claim 2 wherein said spring system includes a compression spring positioned within said guide cylinder between said piston and said object known mass.

4. The device as recited in claim 2 including a guide cylinder closure member on the side of said piston adjacent said impact plate; said spring system including a tension spring secured to said piston and said closure member.

5. The device as recited in claim 1 including an overload indicator and means positioned adjacent said spring system for energizing said overload indicator in response to excessive impact loads.

* * * * *

UNITED STATES PATENT AND TRADEMARK OFFICE
CERTIFICATE OF CORRECTION

PATENT NO. : 4,249,411

DATED : Feb. 10, 1981

INVENTOR(S) : Jerome Pearson

It is certified that error appears in the above—identified patent and that said Letters Patent is hereby corrected as shown below:

On the front page delete:

-- [73] Assignee: The United States of America as represented by the Secretary of the Air Force, Washington, D.C.

Signed and Sealed this

Eighteenth Day of August 1981

[SEAL]

Attest:

GERALD J. MOSSINGHOFF

Attesting Officer     Commissioner of Patents and Trademarks